United States Patent [19]
Almog

[11] 3,732,138
[45] May 8, 1973

[54] PANEL CONSTRUCTIONS

[76] Inventor: Ehud Almog, 13 Yegia Kapaim Street, Ramat Hasharon, Israel

[22] Filed: Mar. 31, 1971

[21] Appl. No.: 129,683

[52] U.S. Cl. .................... 161/43, 52/309, 52/615, 52/618, 52/620, 161/68, 161/69, 161/122, 161/137, 161/161, 161/186, 161/190
[51] Int. Cl. ........................ B32b 3/12, B32b 1/06
[58] Field of Search ............. 161/68, 69, 39–45, 161/111, 122, 137, 160, 161, 186, 190; 52/309, 615, 618, 620

[56] References Cited

UNITED STATES PATENTS

| | | | |
|---|---|---|---|
| 2,053,135 | 9/1936 | Dalton | 161/68 X |
| 2,744,042 | 5/1956 | Pace | 161/68 X |
| 2,973,295 | 2/1961 | Rodgers | 161/190 X |
| 2,951,004 | 8/1960 | Martin et al. | 161/68 X |
| 2,823,460 | 2/1958 | Weiler | 33/174 |
| 3,191,724 | 6/1965 | Ridder | 52/615 X |
| 3,193,434 | 7/1965 | Weiss | 52/615 X |
| 3,204,667 | 9/1965 | Zahorski | 161/137 X |
| 3,544,417 | 12/1970 | Corzine | 161/50 |
| 3,577,305 | 5/1971 | Hines et al. | 161/45 X |
| 3,589,972 | 6/1971 | Greig et al. | 52/309 X |

Primary Examiner—Harold Ansher
Attorney—Benjamin J. Barish

[57] ABSTRACT

A panel characterized in that at least one of its external faces, i.e., the one under compression stresses when the panel is loaded, is made of a lamination including an outer layer bonded to an inner layer by an intermediate layer of rigid plastic foam. The thickness of the rigid plastic foam layer is many times the thickness of each of the said outer and inner layers, and the thickness of the complete panel is many times the thickness of the lamination. The panel further includes strengthening ribs extending longitudinally between the lamination and the other external face of the panel.

12 Claims, 23 Drawing Figures

PATENTED MAY 8 1973
3,732,138
SHEET 1 OF 2
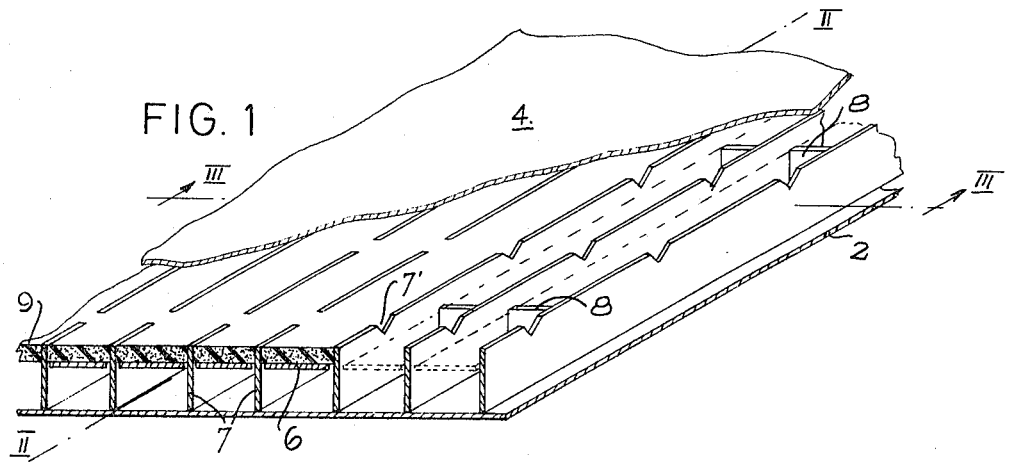
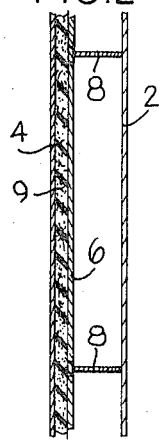
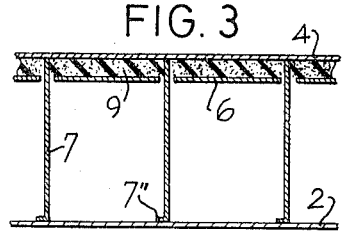
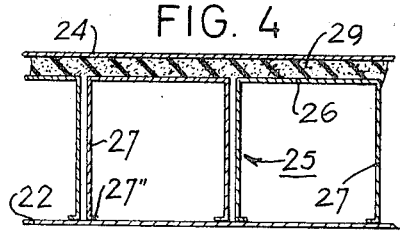
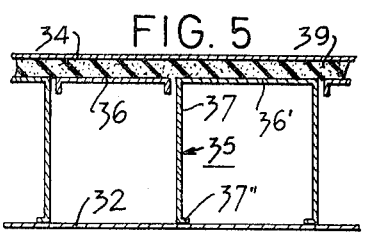
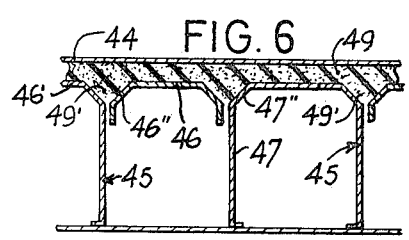
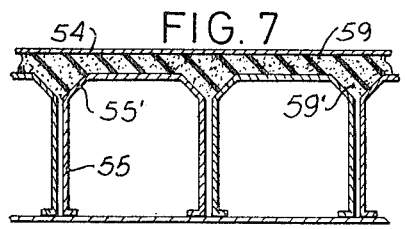
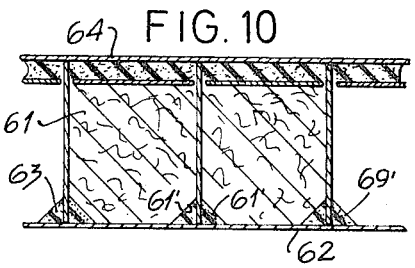
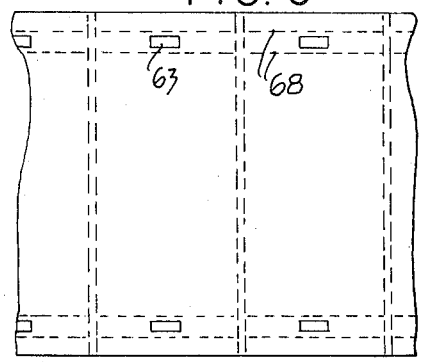
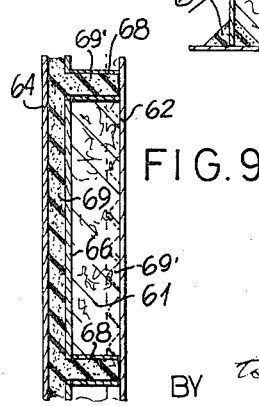
INVENTOR
EHUD ALMOG
BY Benjamin J. Barish
ATTORNEY

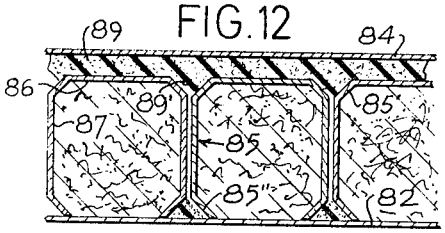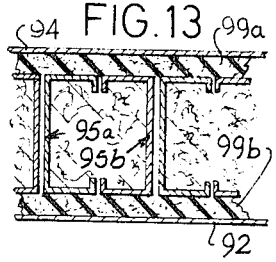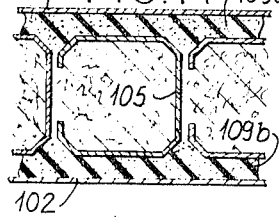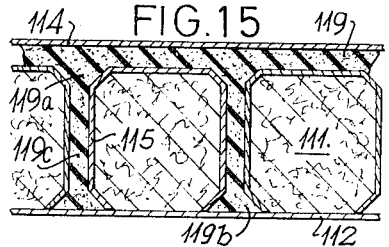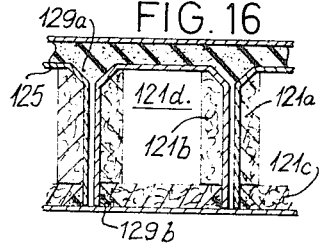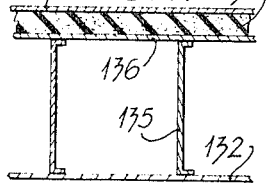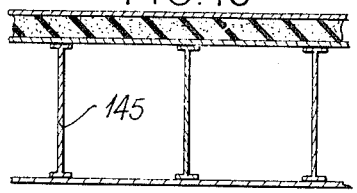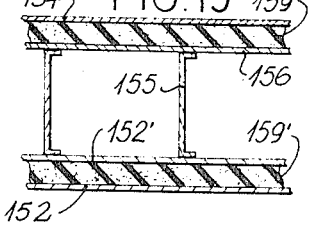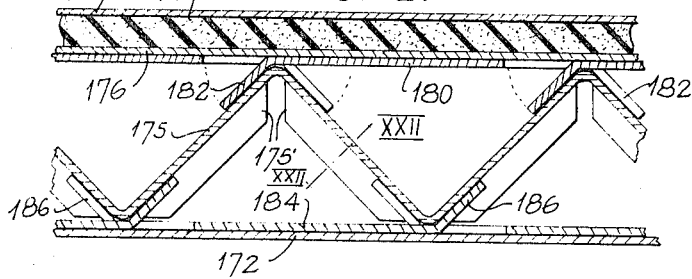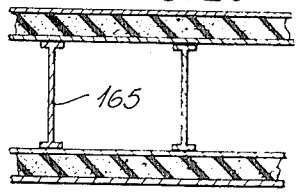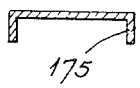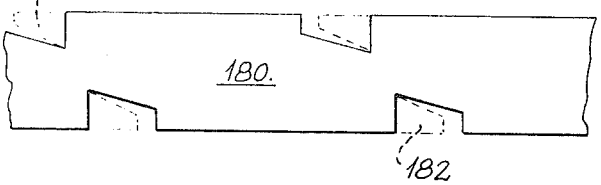

PANEL CONSTRUCTIONS

BACKGROUND OF THE INVENTION

The present invention relates to panel constructions, and particularly to such constructions including rigid plastic foam. Rigid polyurethane foam is especially suitable, but other foams may be used, such as rigid polyester foam.

Rigid polyurethane foam possesses a number of desirable properties, e.g. mechanical strength and good adhesion to most materials, which properties enable it to be advantageously used in panel constructions. My concurrently-filed U.S. Pat. application Ser. No. 129,682 discloses panel constructions including rigid plastic foam (e.g. polyurethane) which are particularly useful for making panels (e.g. for walls or partitions) of up to about 5 meters in length and to withstand relatively light loads. The invention of the present application is particularly useful for making panels of longer spans, or panels to withstand heavier loads, such as floor or roof panels.

In a panel subject to a downwardly-acting load applied to its upper face, the said face of the panel is under compression stresses and its lower face is under tension stresses. By increasing the distance between the two faces it is possible to decrease the thickness of each face layer and thereby to save material. Heretofore, these face layers in the compression and tension zones of the panel have been secured to the intermediate portion of the panel by welding, rivets, or bolts, but as these layers become thinner, with greater distances between them, it becomes increasingly difficult, by using the foregoing conventional methods, to bond them to the intermediate portion of the panel. Also, as the compression layer becomes thinner, the problem of buckling becomes greater. While recently-developed adhesives are suitable for bonding thin layers, they do not solve the problem of buckling.

SUMMARY OF THE INVENTION

Briefly, the present invention aims to solve the above problems by, in effect, splitting the compression face of the panel into two thin spaced layers and filling the space between them by rigid plastic foam which, among other functions, bonds the layers together.

More particularly, the present invention provides a panel having a pair of facing layers constituting the opposed external faces of the panel; a plurality of channel members each having at least a pair of elements one extending longitudinally of the panel parallel to one of said facing layers, and the other element extending longitudinally of the panel substantially at right angles to said one facing layer; and rigid plastic foam bonding said one element of the channel members to said one facing layer and forming a lamination therewith. In the latter lamination, the rigid plastic foam constitutes the intermediate layer. The other elements of the channel members constitute strengthening ribs and extend longitudinally between the lamination and the other facing layer of the panel and are bonded to said other facing layer. The thickness of the intermediate laminate layer of rigid plastic foam is many times the thickness of said one facing layer, and the thickness of the complete panel is many times the thickness of the lamination.

The sum of the thicknesses of the inner (the first mentioned elements of the channel members) and outer layers of the lamination is about the same as the required thickness of the single compression face layer in the conventional panel. For example, if a compression face layer of 1.0 mm thickness is required for a particular load, there would be used two layers each having a thickness of about 0.5 mm, spaced from each other a distance of about 1.5 to 4.0 cm, which space is filled with the rigid plastic foam. In this manner, one layer of the lamination supports the other against buckling. The rigid plastic foam not only bonds the two thin layers together, but also provides additional strength against buckling and also insulation.

Panels are known in which the space between the external face layers is completely filled with rigid plastic foam, but the high cost of producing such panels, particularly of large thickness, makes them uneconomical for many applications.

A number of forms of the invention are described below. In some, the space between the longitudinally-extending strengthening ribs are substantially void and may be used for accommodating air conditioning ducts or the like. In others, the space is occupied by insulating material, such as blocks of polystyrene foam; and in still others, this space is partially void and partially occupied by blocks of insulating material.

Where the panel is designed to withstand loads applied from both sides, the other external face of the panel may also be made of a similar lamination.

Further features and advantages of the invention will be apparent from the description below.

BRIEF DESCRIPTION OF THE DRAWINGS

The invention is herein described, by way of example, with reference to a number of preferred embodiments thereof shown in the accompanying drawings, wherein:

FIG. 1 illustrates a construction of one form of panel made in accordance with the present invention;

FIG. 2 is a longitudinal sectional view, along lines II—II of FIG. 1;

FIG. 3 is a transverse sectional view along lines III—III of FIG. 1;

FIGS. 4–7 are transverse sectional views illustrating other variations of the panel construction of FIG. 1;

FIG. 8 illustrates another form of panel construction in accordance with the present invention;

FIGS. 9 and 10 are longitudinal and transverse sectional views, respectively, of FIG. 8;

FIGS. 11–20 are transverse sectional views illustrating further variations;

FIG. 21 illustrates a still further variation for supporting exceptionally heavy loads, FIG. 22 being a transverse section of the strengthening member used; and FIG. 23 illustrates one of the elements in the panel construction of FIG. 21.

The panel illustrated in FIGS. 1–3 includes a pair of facing layers 2, 4 of strong sheet material forming the opposite faces of the panel. When a downwardly-acting load is applied to the upper face 4, that face becomes compressed, and the lower face 2 becomes tensioned. A plurality of separate flat elements or strips 6 extend longitudinally of the panel spaced from facing layer 4. A further plurality of separate flat elements or strips 7 are provided to extend longitudinally of the panel in parallel planes perpendicular to the plane of elements 6. The upper parts of strips 7 project through the spaces between strips 6 and are notched, as shown at 7'. The lower parts of strips 7 are formed with out-turned flanges 7'' for bonding to facing layer 2. A further plurality of strips or elements 8 are provided to extend transversely of the panel between and bonded to strips 7.

Rigid polyurethane foam 9 is introduced into the space between strips 6 and facing layer 4 by injection under pressure, so as to completely fill this space and to bond together strips 6, 7 and 8 to facing layer 4. Spacing elements (not shown), such as plastic blocks, may be used for maintaining strips 6 spaced from facing layer 4 during this injection operation.

The lower ends of strips 7 are then bonded to facing layer 2 by any suitable adhesive (e.g. an epoxy resin) applied between their flanges 7'' and layer 2.

Facing layers 2, 4 are preferably made of metal sheets, such as aluminum or galvanized iron, but may be made of other strong sheet materials such as fiberglass reinforced polyester resin. Elements 6, 7 and 8 are also preferably of metal sheet material for example of the same material as facing layers 2, 4.

It will be seen that face 4, which is the one under compression when the panel is loaded by a downwardly applied force, is actually the outer layer of a lamination including an inner layer of the separate flat elements or strips 6, and an intermediate layer of rigid plastic foam 9. The thickness of the foam layer is many times the thickness of outer layer 4 and inner layer 6. Mentioned earlier was the example in which layers 4 and 6 are each of about 0.5 mm, and the spacing between them filled with the rigid polyurethane foam is about 1.5 to 4.0 cm, that is, greater by at least one or two orders of magnitude. As pointed out there, layer 4 may be made very thin since it is supported against buckling by layer 6 and the polyurethane layer 9, the polyurethane not only enabling the two thin layers 4, 6 to be bonded together and to the panel, but further providing insulation between the two layers and strength to the panel.

Elements 7 form longitudinally-extending strengthening ribs between laminated face 4 and lower face 2 of the panel, these strengthening ribs also being bonded by the rigid polyurethane foam 9. The height of strips 7 is many times the thickness of the laminated face (layers 4, 6, 9), so that the thickness of the complete panel will be many times the thickness of that lamination. For example, in the above example wherein the lamination may be 1.5 to 4.0 cm, the thickness of the complete panel may be 10-45 cm, that is about one or two orders of magnitude greater than the thickness of the lamination.

FIG. 4 illustrates a panel including a plurality of channel members each having at least a pair (in this case three) elements extending at right angles to each other and corresponding to the strips 6,7 of FIGS. 1–3. In the arrangement of FIG. 4, the channel members 25 are of U-shaped section and comprise three of such elements. The interconnecting webs 26 of the channel members correspond to the strips 6 in FIGS. 1–3, and the two outer legs 27 of the channel members correspond to the longitudinal strengthening ribs or strips 7. The rigid polyurethane foam 29 is introduced by injection between legs 26 and outer layer 24 of the panel.

The other facing layer 22 is bonded to the panel by means of an adhesive, such as an epoxy resin, applied between it and out-turned flanges 27'' formed on the lower ends of legs 27.

FIG. 5 illustrates a further variation, wherein there are used channel members 35 alternating with strips 36. In this arrangement, strips 36 and the interconnected webs 36' of the channel members correspond to elements 6 of FIGS. 1–3, and the outer legs 37 of channel members correspond to strips 7. The channel members 35 and strips 36 are bonded to the upper facing layer 34 by rigid polyurethane foam 39. The channel members are bonded to the lower facing layer 32 by an adhesive applied between it and flanges 37'' of the channel members 35.

FIG. 6 illustrates a variation similar to that of FIG. 5 except that the strips 46 (corresponding to strips 36 in FIG. 5) are formed with bevelled side walls 46'', and similarly the junctures between the interconnected webs 46' and the outer legs 47 of the channel members 45 are bevelled as shown at 47''. Thus, when the rigid polyurethane foam 49 is introduced between strips 46 and legs 46' to join them to facing layer 44, the foam will also flow into the spaces between these bevelled side walls. This produces longitudinally extending ribs 49' of rigid polyurethane foam, which further reinforce the panel.

FIG. 7 illustrates the above feature of FIG. 6 incorporated in a panel construction utilizing U-shaped channel members 55, wherein the junctures between the interconnected webs and the outer legs are bevelled, as shown at 55', to permit the rigid polyurethane foam 59 to form the reinforcing ribs 59' when bonding these elements to facing layer 54.

The variation illustrated in FIGS. 8–10 provides transverse ribs of rigid polyurethane foam together with the longitudinal ribs provided in the variations of FIGS. 6 and 7. Such transverse ribs are produced by including, for each of the transverse strips 8 (FIGS. 1–3), a pair of closely-spaced transverse strips 68. Thus, when the rigid polyurethane foam 69 is introduced, for example through the openings 63, it will also flow into the spaces between strips 68 and form transverse ribs 69' of rigid polyurethane foam, which further strengthen the panel.

FIGS. 8–10 illustrate a further variation over the embodiments described earlier. Whereas in the earlier embodiments the interior of the panel was substantially void, in FIGS. 8–10, this interior is occupied by blocks of insulating or filler material 61, for example polystyrene foam or glass wool. When such blocks are used, it is preferable to provide bevelled edges 61', which are filled with rigid polyurethane foam, forming longitudinally-extending ribs 69' which further strengthen the panel. When the panel includes the blocks of insulating material, the transverse strips 68 may be omitted as the spaced sides of the blocks will provide the space for forming the transverse polyurethane ribs 69'.

FIG. 11 illustrates a similar arrangement, except that U-shaped channel members 75 are used (as in FIG. 4), the interconnected webs 76 of which constitute the elements corresponding to strips 6 in FIGS. 1–3, and the outer legs 77 of which constitute the perpendicular strengthening elements or ribs 7 in FIGS. 1–3. As in FIGS. 8–10, the interior of the U-shaped channel members 75 are filled with blocks of insulating material 71, and the blocks are bevelled to produce the ribs 79' of rigid polyurethane foam.

FIG. 12 illustrates an arrangement similar to FIG. 11, except that the junctures between walls 86 and 87 of members 85 are bevelled, as shown at 85', so that when the rigid polyurethane foam 89 is introduced, it forms longitudinally-extending ribs 89' between these members and layer 84. The ends of legs 87 are also turned inwardly, as shown at 85'', these ends being bonded to the lower facing layer 82 by rigid polyurethane foam which forms longitudinally extending ribs 89' at the opposite side of the panel.

FIGS. 13 and 14 illustrate two further variations, wherein both of the faces are formed of laminations. Such constructions are particularly useful where the panel is subject to loads from both directions, since both faces are thus supported against buckling. In FIG. 13 the inner layers of each lamination, as well as the longitudinal strengthening ribs, are formed by pairs of U-shaped channel members 95a, 95b having their open sides facing each other; and in FIG. 14 they are formed by a series of channel members 105 lying on their sides with the interconnected webs of one facing the open side of the next. In FIG. 13, there is a layer 99a of rigid polyurethane foam between the upper layer 94 and the upper legs of members 95a, 95b (the latter forming the inner layer of that lamination) and another layer 99b of the polyurethane foam between the lower legs of these members (forming the inner layer of the lower lamination) and the lower layer 92. In FIG. 14, there is a layer 109a of the rigid polyurethane foam between the upper legs of members 105 and the upper layer 104, and another layer 109b between the lower legs of these members and the lower layer 102.

FIG. 15 illustrates a further variation, wherein adjacent strengthening members 115 are spaced slightly from each other so as to provide a space 119c to be filled with rigid polyurethane foam when the latter is introduced under pressure by injection. The variation of FIG. 15 also includes the formation of the longitudinal ribs 119a and 119b of rigid polyurethane foam, and the provision of insulating material 111 within the reinforcing members 115, both described in earlier embodiments. The variation of FIG. 15 can be produced by one-stage injection molding operation, since the rigid polyurethane foam, when introduced to bond layer 114, will flow through space 119c and will also bond the lower layer 112.

FIG. 16 illustrates a further variation wherein, instead of completely filling the interior of the strengthening members 125 with insulating material, the interior is only partially filled with insulating blocks 121a, 121b, 121c, the remainder of the space 121d being void. In the variation illustrated, one end of blocks 121a, 121b is bevelled, and the two ends of blocks 121c are bevelled, so as to produce the longitudinally-extending strengthening ribs 129a and 129b of rigid polyurethane foam.

FIGS. 17 and 18 illustrate two further variations, particularly for use in panels to cover large spans or to withstand large forces applied from one side of the panel. In FIG. 17 for example, the inner layer of the lamination is in the form of a continuous sheet 136 (preferably of the same material as facing layers 132, 134) bonded by rigid polyurethane foam 139 to facing layer 134. The longitudinally-extending strengthening ribs (7 in the embodiment of FIGS. 1–3) are in the form of U-shaped beams or channel members 135. The latter are bonded to layers 136 and 132 by any suitable adhesive, such as an epoxy resin. FIG. 18 is similar to FIG. 17, except that the strengthening ribs are in the form of I-beams 145.

The panels of FIGS. 19 and 20 are similar to the arrangements illustrated in FIGS. 17 and 18, respectively, except that both faces of the panel are constructed as laminations as described above with respect to facing layer 134, in order to withstand large forces applied from either side of the panel. Thus in FIG. 19, layers 154, 156, 159 correspond to layers 134, 136, 139 of FIG. 17, and channel members 155 correspond to channel members 135 of FIG. 17. In addition, there is provided a further sheet 152' (corresponding to sheet 156) bonded to the lower facing layer 152 by rigid polyurethane foam 159'. The panel of FIG. 20 is of similar construction, except that I-beams 165 are used instead of the channel members 155.

FIGS. 21–23 illustrate a still further variation, designed particularly for very heavy loads applied from one side of the panel. This variation includes facing layers 172, 174 corresponding to layers 132, 134 in FIG. 17; the inner laminated layer 176 corresponding to layer 136 in FIG. 17; and the rigid polyurethane foam layer 179 corresponding to layer 139 in FIG. 17. The strengthening ribs in FIGS. 21–23, however, are in the form of trusses 175. Each of the trusses 175 is a U-shaped channel member (see FIG. 22) which is bent into a serpentine shape, its outer legs preferably having been slit to permit the member to be bent, as shown at 175'. Each truss 175 is secured to layer 176 by a further strip 180 (e.g. of sheet metal) which is adhesively bonded to layer 176. Strip 180 is formed with turned-out tabs 182, slit from the sheet (see FIG. 23), to which the bent portions of the truss member 175 are adhesively bonded. The truss is fixed to the lower facing layer 172 by a similar sheet 184 having turned-out tables 186.

In any of the described embodiments, one or both of the external layers may be corrugated.

Many other variations, modifications, and applications of the illustrated embodiments will be apparent.

What is claimed is:

1. A panel comprising a pair of facing layers constituting the opposed external faces of the panel; a plurality of channel members each having at least a pair of elements one extending longitudinally of the panel parallel to one of said facing layers, and the other extending longitudinally of the panel substantially at right angles to said one facing layer; and rigid plastic foam bonding said one element of the channel members to said one facing layer forming a lamination therewith in which the rigid plastic foam constitutes the intermediate layer of the lamination; said other elements of the channel members constituting strengthening ribs extending longitudinally between said lamination and the other facing layer of the panel, and bonded to said other facing layer; the thickness of the intermediate laminate layer of rigid plastic foam being many times the thickness of said one facing layer, and the thickness of the complete panel being many times the thickness of said lamination.

2. A panel as defined in claim 1, wherein said rigid plastic foam is rigid polyurethane foam.

3. A panel as defined in claim 1, wherein the space between said longitudinally-extending strengthening ribs is substantially void.

4. A panel as defined in claim 1, wherein the space between said longitudinally-extending strengthening ribs is occupied by insulating material.

5. A panel as defined in claim 1, wherein the space between said longitudinally-extending strengthening ribs is partially void and partially occupied by blocks of insulating material.

6. A panel as defined in claim 1, wherein said strengthening ribs are joined to said other facing layer by an epoxy adhesive.

7. A panel as defined in claim 1, wherein said strengthening ribs are joined to said other facing layer by rigid plastic foam.

8. A panel as defined in claim 1, wherein said channel members are U-shaped in section and include a pair of legs and an interconnecting web substantially at right angles to said legs.

9. A panel as defined in claim 8, wherein the junctures of said interconnecting webs and legs of the channel members are beveled whereby the rigid plastic foam layer bonded thereto is formed with longitudinally extending plastic strengthening ribs.

10. A panel as defined in claim 8, wherein said channel members are disposed with the open side of one channel member facing the open side of the next adjacent one, the rigid plastic foam bonding one leg of each channel member to said one facing layer, the other leg of each channel member being bonded to the other facing layer, the interconnecting webs constituting the longitudinally extending strengthening ribs.

11. A panel as defined in claim 8, wherein said rigid plastic foam bonds the interconnecting webs of the channel members to said one facing layer, the legs of the channel members constituting said strengthening ribs.

12. A panel as defined in claim 11, wherein said lamination further includes strips alternating with said channel members and bonded by said rigid plastic foam to said one facing layer.

* * * * *